United States Patent [19]

Clarisse

[11] Patent Number: 4,577,818
[45] Date of Patent: Mar. 25, 1986

[54] APPARATUS ADAPTED TO BE MOUNTED IN A MOUNTING WALL

[75] Inventor: Eddy J. Clarisse, Eindhoven, Netherlands

[73] Assignee: U.S. Philips Corporation, New York, N.Y.

[21] Appl. No.: 672,442

[22] Filed: Nov. 16, 1984

[30] Foreign Application Priority Data

Nov. 17, 1983 [NL] Netherlands .......................... 8303946

[51] Int. Cl.⁴ .............................................. G12B 9/00
[52] U.S. Cl. ................................... 248/27.3; 339/131
[58] Field of Search ..................... 248/27.3, 27.1, 244, 248/DIG. 6; 312/245; 200/295, 296; 220/3.5, 3.6; 339/131

[56] References Cited

U.S. PATENT DOCUMENTS

| | | | |
|---|---|---|---|
| 2,605,806 | 8/1952 | Tinnerman | 220/3.5 X |
| 2,616,643 | 11/1952 | Budd | 339/131 |
| 2,930,505 | 3/1960 | Meyer | 248/27.1 X |
| 2,969,418 | 1/1961 | Benander | 339/131 X |
| 2,973,175 | 2/1961 | Appleton | 248/27.1 |
| 3,308,260 | 3/1967 | Krieger et al. | 200/295 |
| 3,368,780 | 2/1968 | Buttriss | 248/27.3 |
| 3,685,879 | 8/1972 | Tsuji | 248/27.3 X |
| 3,706,869 | 12/1972 | Sorenson | 200/295 |
| 3,799,483 | 3/1974 | Chiappinelli | 248/27.3 |
| 4,524,933 | 6/1985 | Rouws | 339/131 X |

Primary Examiner—Ramon S. Britts
Assistant Examiner—Ramon O. Ramirez
Attorney, Agent, or Firm—David R. Treacy

[57] ABSTRACT

An apparatus is secured in an opening in a mounting wall by clamping surfaces of the mounting wall adjoining the opening between a flange on the apparatus and a shoulder on the spring. A bolt is passed through the flange and screwed into the spring shoulder to make clamping force independent of the thickness of the mounting wall.

7 Claims, 5 Drawing Figures

APPARATUS ADAPTED TO BE MOUNTED IN A MOUNTING WALL

BACKGROUND OF THE INVENTION

The invention relates to an apparatus adapted to be mounted in an opening in a mounting wall; and more particularly to an apparatus which is secured by a mounting spring which is mounted on a wall of the apparatus and which flexes in a direction transverse to the direction in which the apparatus is inserted in the opening, so as to clamp the mounting wall between a shoulder on the spring and the flange on the apparatus.

A known apparatus of the above kind (see German patent application No. 2,360,600) uses a mounting spring which is molded in one piece with a front panel. The panel is secured to the apparatus by threaded sleeves and nuts. The shoulder of the mounting spring is wedged against a part of the mounting wall by an abutment surface on a mounting plate. A disadvantage of such an apparatus is that, with thicknesses of mounting walls which differ greatly in practice, the same apparatus is mounted with differing securing forces or clamping forces. Moreover, a separate mounting plate is required.

Another form of mounting is shown in European Patent Application 0073073, to which U.S. patent application Ser. No. 644,667 now Pat. No. 4,524,933 corresponds. In that arrangement a bifurcate mounting spring is fixedly secured to a side wall of an apparatus. The apparatus is secured in a mounting wall by means of a shell. Adaptation to the different thicknesses of mounting walls is obtained by the flexibility of tongues formed in the shell.

SUMMARY OF THE INVENTION

An object of the invention is to provide a mounting spring which is readily accommodated to mounting walls having substantially differing thicknesses.

Another object is to mount an apparatus through the use of a simple spring assembly without any separate plate.

According to the invention the mounting spring is slidably guided on the apparatus wall. The spring carries a bolt which is screwed into the mounting spring. When the apparatus is mounted in the mounting wall, the bolt is tightened to pull the flange of the apparatus, a part of the mounting wall and the shoulder of the mounting spring tightly together, preferably by capturing the apparatus flange and the mounting wall between the mounting spring shoulder and the head of the bolt.

By having the mounting spring movable with respect to the apparatus in a direction parallel to the direction in which the apparatus is inserted in the opening in the mounting wall (hereinafter referred to as the insertion direction), the securing force or clamping force is made independent of the thickness of the mounting wall. The pulling force of the bolt can be equal for the same apparatus despite different thicknesses of the mounting wall.

In a particular embodiment of the invention having a mounting spring that can be mass produced in a simple manner, the mounting spring is a rectangular blade spring which is made of sheet metal. The spring has a central first longitudinal strip which is guided parallel to the insertion direction, extends substantially in a plane parallel to the plane of the apparatus wall, and has a free end which is oriented in a direction opposite to the insertion direction; and second and third longitudinal strips lying in a plane which is inclined to the plane containing the first strip, the second and third longitudinal strips being arranged symmetrically with respect to the first longitudinal strip and being interconnected by a first transverse strip on which the spring shoulder is formed at a right angle to the insertion direction.

A further embodiment of the invention, having a simple sliding guide for the movement of the mounting spring relative to the apparatus in a direction parallel to the insertion direction, is characterized in that the apparatus wall is provided with a guide rib which fits slidably in a slot in the first longitudinal strip of the mounting spring. The rib and slot each extend in the insertion direction. The mounting spring comprises a second transverse strip which interconnects the second and third longitudinal strips and which has a projection which is guided in a window in the apparatus wall.

Another preferred embodiment of the invention facilitates removal of the apparatus from the mounting wall the mounting spring is provided with an actuation tongue which is arranged at right angles to the shoulder of the spring and which, when the apparatus is mounted in the opening in the mounting walls extends beyond the clamped part of the mounting wall and is accessible for the operation of removing the apparatus from the opening.

An embodiment of the invention will be described more fully with reference to the drawing.

DESCRIPTION OF THE PREFERRED EMBODIMENT

Figure 1:
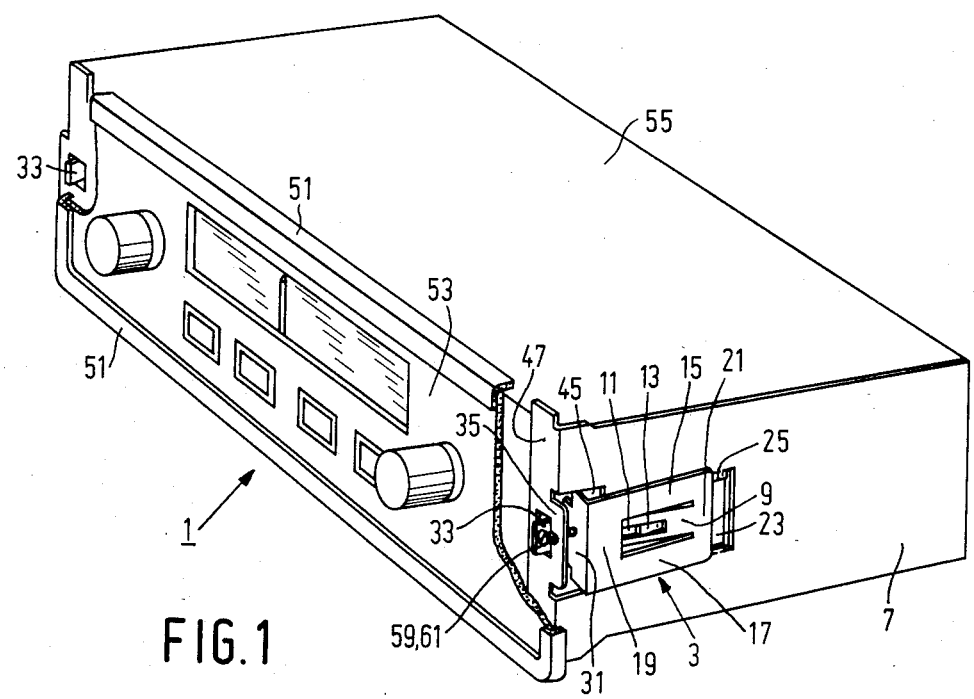
FIG. 1 is a perspective view of an apparatus according to the invention in the unmounted state.
Figure 2:
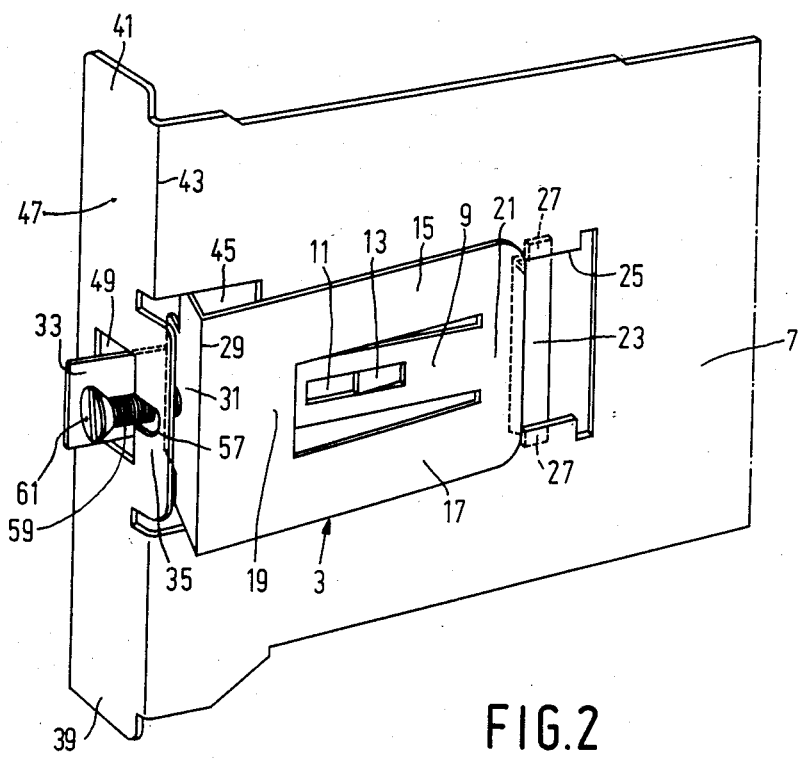
FIG. 2 is a perspective view drawn to a larger scale than FIG. 1, of the mounting spring and a part of the apparatus shown in FIG. 1.
Figure 3:
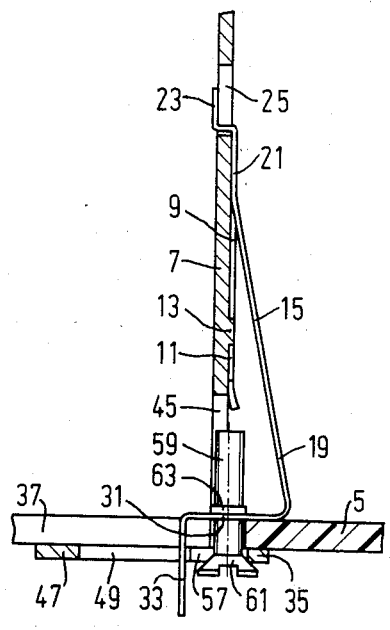
FIG. 3 is a sectional plan view of the part shown in FIG. 2 when the apparatus is mounted in the mounting wall.
Figure 4:
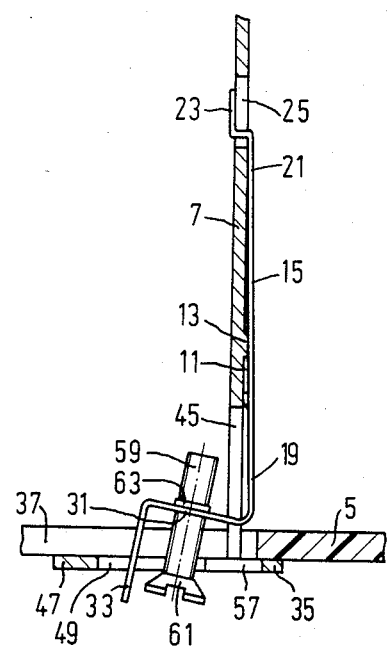
FIG. 4 is a view similar to FIG. 3 illustrating a first stage in the removal of the apparatus from the mounting wall.
Figure 5:
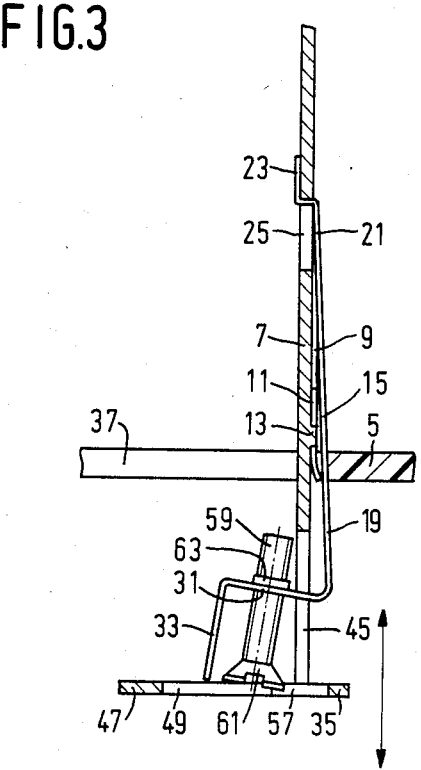
FIG. 5 is a view similar to FIG. 3 illustrating a further stage in the removal (mounting) process.

The apparatus 1 in the form of a rectangular box shown in FIG. 1 is provided with at least two blade-type mounting springs 3 of hardened steel for securing the apparatus 1 in an opening 37 in a mounting wall 5 (see FIGS. 3, 4 and 5). Each of the two mounting springs 3 (only one mounting spring is visible) is slidably guided in one of the side walls of the apparatus 1. The mounting spring 3 visible in FIG. 1 is guided in the side wall 7. The two mounting springs are arranged symmetrically with respect to a central plane passing through the apparatus 1. Each mounting spring 3 is made of sheet metal having a thickness of about 0.5 mm and has a substantially rectangular shape (see also FIG. 2). A first longitudinal strip 9 of the mounting spring 3 extends substantially in a plane parallel to the plane of the side wall 7 and is provided with a slot 11 which is parallel to the insertion direction; that is the direction in which the apparatus is inserted in the opening 37 in the mounting wall. A guide rib 13 formed on the side wall 7 fits slidably in the slot 11. The longitudinal strip 9 is disposed centrally of the mounting spring 3 between a second upper longitudinal strip 15 and a third lower longitudinal strip 17. These longitudinal strips 15 and 17 are parallel to each other and are arranged symmetrically with respect to the central first longitudinal strip 9. The plane containing the longitudinal strips 15 and 17 encloses an acute angle with the plane containing the first longitudinal strip 9 and the plane passing through the side wall 7.

At the end of the mounting spring 3 which is nearer the front side of the apparatus, the longitudinal strips 15 and 17 are interconnected by a first transverse strip 19. A second transverse strip 21 interconnects the longitudinal strips 15 and 17 at the rear end of the mounting spring 3. The second transverse strip 21 has an orthogonally bent projection 23 which extends through a window 25 in the side wall 7. The projection 23 is provided with two tongues 27 (see FIG. 2) which are slidably guided along the inner side of the side wall 7. The tongues 27 are indicated by dotted lines in FIG. 2. The first transverse strip 19 is bent through an obtuse angle along a bending line 29 to form a shoulder 31 on the mounting spring 3. The shoulder 31 has an orthogonally bent portion which forms an actuation tongue 33. Both the shoulder 31 and the actuation tongue 33 have a width which is smaller than the width of the mounting spring 3.

The side wall 7 of the apparatus is formed with a flange 35 which extends at right angles to the plane containing the side wall 7. In the mounted state of the apparatus 1 (see FIG. 3), the flange 35, which lies in a plane parallel to the mounting wall 5, extends beyond an edge of the mounting opening 37 in the mounting wall 5 and thus is located in part in front of the mounting wall 5. The side wall 7 is further provided at its lower and upper sides, respectively, (see FIG. 2) with supporting tongues 39 and 41, which in the mounted state are located against the front side of the mounting wall 5 (not shown in FIG. 2). The flange 35 and the supporting tongues 39 and 41 are formed by stamping from a metal plate from which the side wall 7 also is formed, followed by orthogonal bending about a bending line 43 (see FIG. 2), as a result of which a window 45 is formed in the side wall 7. The shoulder 31 extends through this window. The flange 35 and the supporting tongues 39 and 41 thus form parts of a supporting plate 47, whose plane is at right angles to the side wall 7. The supporting plate 47 is further provided with an opening 49 through which the actuation tongue 33 passes.

A front panel 53 provided with an angular profile 51 (see FIG. 1) is secured in a manner not shown to the supporting plate 47 and an upper wall 55 of the apparatus 1. The usual box-shaped construction of the apparatus 1 does not need further description. The flange 35 is provided with a slot 57 extending from the opening through which passes a bolt 59 with a head 61 (see FIG. 2) which forms a shoulder on the bolt. The bolt 59 is screwed a nut or threaded the shoulder 31 of the mounting spring 3. For this purpose the shoulder 31 is provided with a threaded sleeve 63. The sleeve 63 is formed by stamping a hole in the shoulder 31 and by subsequently curling over the wall of this hole to form the sleeve 63 (see FIG. 3, 4 and 5). The bolt 59 is preferably made of steel. The bolt connection described is to be preferred if the apparatus has to be mounted and removed several times. However, for a single mounting operation an unthreaded opening may be provided in the shoulder 31 to receive a self-tapping bolt. It is alternatively possible to provide a threaded hole in a locally strengthened part of the shoulder 31. It should be noted that an identical mounting spring with a bolt (not visible) is provided at the left-hand side (in FIG. 1) of the apparatus.

The operation of mounting the apparatus 1 in and removing it from the wall 5 will be described with reference to FIGS. 3, 4 and 5. In the mounted state of the apparatus shown in FIG. 3, viewed from the front to the back, the flange 35 and a part of the mounting wall 5, in succession, are clamped between the shoulder formed by the head 61 of the bolt 59 and the shoulder 31 of the mounting spring 3.

The mounting wall 5 is thus captured firmly between two planar surfaces, shoulder 31 being further braced by strips 15, 17, 19 and 21. The head 61 of the bolt 59 lies in the extreme right-hand position in the slot 57 in the flange 35. The guide rib 13 on the side wall 7 is situated in the rear part of the slot 11 of the first longitudinal strip 9 of the mounting spring 3, while the projection 23 is situated in the front part of the window 25 in the side wall 7. If the apparatus were mounted in a mounting wall having, for example, a larger thickness than is shown in FIG. 3, the guide rib 13 would be situated at a given distance from its rearmost position in the slot 11, while the projection 23 would be situated at the distance from its foremost position in the window 25. This distance is determined by the difference in thickness of the mounting wall with respect to the situation shown in FIG. 3.

The tensile force in the bolt 59 is fully independent of the thickness of the mounting wall, which may lie between 2 and 6 mm. It has been found in practice that an apparatus, such as, for example, a car radio, thus mounted with two mounting springs remains firmly secured both in the horizontal and in the vertical direction with all the acceleration and deceleration forces which occur, even if there is no additional support at the rear of the apparatus. This is the more remarkable as the center of gravity of the apparatus generally lies a considerable distance behind the mounting wall.

The apparatus mounted in the manner shown in FIG. 3 is removed from the mounting wall 5 by unscrewing the bolt 59, subsequently pulling the actuation tongue 33 to the left against the spring force of the longitudinal strips 15 and 17 of the mounting springs 3 until the shoulder 31 lies entirely within the circumference of the mounting opening 37 and then pulling the apparatus forwards. The longitudinal strips 15 and 17 can then slide along the edge of the mounting openings 37 under the force of their resilience. Of course this happens both at the left-hand side and at the right-hand side of the apparatus with both mounting springs. The longitudinal strips 15 and 17 of each mounting spring return to their outward position in FIG. 5 to the right as soon as they have passed over their entire length through the mounting opening 37. The situation shown in FIGS. 1 and 2 is then reached.

FIG. 5 shows the situation which occurs about halfway through the removal or mounting operation. It can be clearly seen that the longitudinal strips 15 and 17 can slide along the edge of the mounting opening 37 under the force of their resilience if the manual force applied to the actuation tongue 33 has a component, in a direction at right angles to the direction of insertion or removal of the apparatus, which is not too large. The whole mounting and removal operation, respectively, can be carried out with the use of a srew-driver as the only tool. By a suitable proportioning of the mounting springs 3 it can be achieved that in the unmounted state of the apparatus the longitudinal strip 9 of each spring slidably engages of the apparatus which a light biasing force the side wall 7. This may be obtained, for example, by arranging the tongues 27 of the spring in a plane which is not entirely parallel to the plane containing the second transverse strip 21 of the spring, which lies substantially in the same plane as the first longitudinal strip 9.

It should be noted that, although the invention has been described for an apparatus having a mounting spring on each of the side walls, of course also a larger number of mounting springs may be used. For example, mounting springs may be provided in the upper wall and in the lower wall of the apparatus. Furthermore, the invention is not limited to the mounting of an apparatus in a rectangular mounting opening. In principle, two parallel edges or edge portions of the mounting openings as well as two parallel mounting surfaces for the mounting spring at the apparatus are necessary. The invention may be applied to many kinds of apparatus, such as, for example, car radios, cassette players and transmitter and receiver apparatus.

What is claimed is:

1. An apparatus having means for mounting in an opening in a mounting wall by engaging inner and outer surfaces of the wall, comprising a flange formed on the apparatus, and a mounting spring mounted on a wall of the apparatus, said mounting spring being resilient in a direction transverse to the insertion direction and having a shoulder arranged for clamping a part of the mounting wall against the flange,
    characterized by comprising means for guiding the mounting spring slidably on said apparatus wall in a direction parallel to said insertion direction,
    a bolt having a shoulder, and
    screw thread means for connecting the bolt to the spring shoulder, arranged such that, when the apparatus is mounted in a mounting wall, the bolt pulls the apparatus flange and the mounting spring shoulder toward each other so as to clamp the apparatus flange and part of the mounting wall between the shoulder on the bolt and the shoulder of the mounting spring.

2. An apparatus as claimed in claim 1, characterized in that:
    said mounting spring is a sheet metal blade spring, comprising a central first longitudinal strip, second and third longitudinal strips and a first transverse strip,
    said means for guiding is arranged to guide said first longitudinal strip for movement solely in a direction parallel to said insertion direction, said first longitudinal strip extending substantially in a plane parallel to the plane of said apparatus wall, and having a free end oriented in a direction opposite to the direction of insertion,
    said second and third longitudinal strips lie in a plane inclined to the plane containing said first strip, said second and third strips being arranged symmetrically with respect to the first longitudinal strip and being interconnected to said first longitudinal strip at one end, and interconnected to said first transverse strip at an end adjacent said flange, and
    said shoulder is formed by a portion of said first transverse strip extending at a right angle to said insertion direction.

3. An apparatus as claimed in claim 2, characterized in that:
    said means for guiding comprises a guide rib on said apparatus wall, and a slot in said first longitudinal strip extending in a direction parallel to the insertion direction, within which slot the guide rib fits slidably,
    said apparatus wall has a window spaced from said flange, and
    the mounting spring comprises a second transverse strip interconnecting the second and third longitudinal strips, and having a projection which is guided in said window.

4. An apparatus as claimed in claim 3, characterized in that said mounting spring comprises an actuation tongue extending from and at right angles to said spring shoulder; and said apparatus has a further opening through said flange, said tongue extending through said opening, arranged such that, when the apparatus is mounted in a mounting wall opening, the tongue extends through the mounting wall opening so as to be accessible for manually deflecting the mounting spring as a step during removal of the apparatus from an opening in a wall.

5. An apparatus as claimed in claim 4 characterized in that said further opening communicates with a slot in the flange, said bolt extending through said slot when the apparatus is mounted in a mounting wall, such that the bolt shoulder engages a surface of the flange adjoining said slot; and upon deflection upon said mounting spring during insertion or removal, said tongue and bolt shoulder are each so disposed as to be able to pass through said further opening.

6. An apparatus as claimed in claim 2 characterized in that said mounting spring comprises an actuation tongue extending from and at right angles to said spring shoulder, and said apparatus has a further opening through said flange, said tongue extending through said opening, arranged such that, when the apparatus is mounted in a mounting wall opening, the tongue extends through the mounting wall opening so as to be accessible for manually deflecting the mounting spring as a step during removal of the apparatus from an opening in a wall.

7. An apparatus as claimed in claim 1, characterized in that said mounting spring comprises an actuation tongue extending from and at right angles to said spring shoulder, and said apparatus has a further opening through said flange, said tongue extending through said opening, arranged such that, when the apparatus is mounted in a mounting wall opening, the tongue extends through the mounting wall opening so as to be accessible for manually deflecting the mounting spring as a step during removal of the apparatus from an opening in a wall.

* * * * *